US008668369B2

(12) United States Patent
Aust

(10) Patent No.: US 8,668,369 B2

(45) Date of Patent: Mar. 11, 2014

(54) LIGHTING DEVICE FOR VEHICLES AND A METHOD FOR PRODUCING IT

(75) Inventor: Frank Aust, Dormagen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 346 days.

(21) Appl. No.: 13/170,914

(22) Filed: Jun. 28, 2011

(65) Prior Publication Data

US 2012/0002432 A1 Jan. 5, 2012

(30) Foreign Application Priority Data

Jun. 30, 2010 (DE) ......................... 10 2010 030 743

(51) Int. Cl.
*B60Q 1/00* (2006.01)

(52) U.S. Cl.
USPC ............ 362/509; 362/546; 362/267; 362/375

(58) Field of Classification Search
USPC ......... 362/509–522, 546, 267, 362, 374, 375, 362/158, 645
See application file for complete search history.

(56) References Cited

U.S. PATENT DOCUMENTS

| | | | | |
|---|---|---|---|---|
| 4,612,607 | A * | 9/1986 | Segoshi et al. | 362/547 |
| 4,922,398 | A * | 5/1990 | Muto | 362/459 |
| 5,113,330 | A * | 5/1992 | Makita | 362/528 |
| 5,424,874 | A * | 6/1995 | Ishikawa et al. | 362/546 |
| 5,947,591 | A | 9/1999 | Katsumata et al. | |

FOREIGN PATENT DOCUMENTS

| | | |
|---|---|---|
| DE | 197 19 832 A1 | 11/1997 |
| DE | 197 22 005 A1 | 3/1998 |

* cited by examiner

*Primary Examiner* — Bao Q Truong

(74) *Attorney, Agent, or Firm* — Damian Porcari; Brooks Kushman P.C.

(57) ABSTRACT

The invention relates to a lighting device for vehicles, having a housing, a translucent diffusing screen covering a light exit opening of the housing, and a reflector. The translucent diffusing screen and the reflector may be fastened to the housing. A rapidly curing connection means may be applied to at least one interface between the housing and the diffusing screen to facilitate positioning.

20 Claims, 1 Drawing Sheet

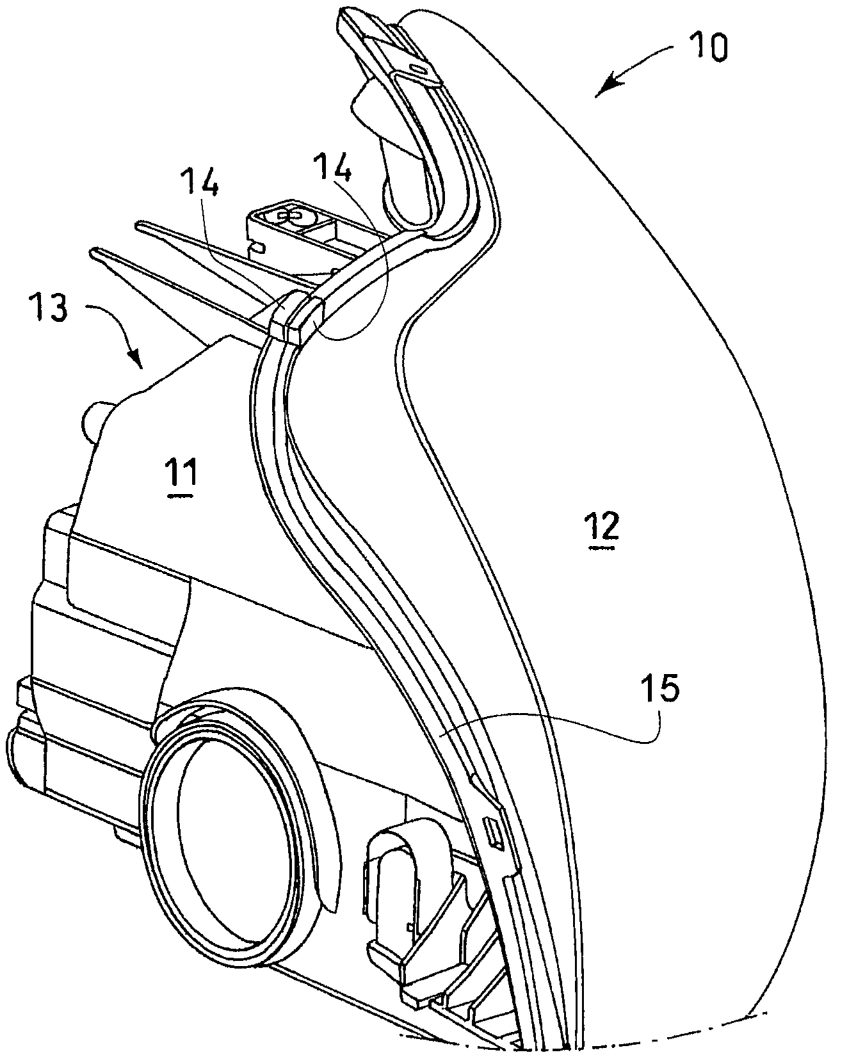
10
14
14
13
11
12
15

LIGHTING DEVICE FOR VEHICLES AND A METHOD FOR PRODUCING IT

CROSS-REFERENCE TO RELATED APPLICATIONS

This application claims foreign priority benefits under 35 U.S.C. §119(a)-(d) to DE 10 2010 030 743.2, filed Jun. 30, 2010, which is hereby incorporated by reference in its entirety.

TECHNICAL FIELD

The invention relates to a lighting device for vehicles, having a housing, a translucent diffusing screen covering a light exit opening of the housing, and a reflector, wherein the translucent diffusing screen and the reflector are fastened on to the housing. The invention relates, furthermore, to a method for producing such a lighting device for vehicles.

BACKGROUND

Present day lighting devices for vehicles, such as headlamps, consist of a housing, a reflector, and a plastic diffusing screen. The reflector, if embodied as a separate component, is frequently screwed into the housing, and the diffusing screen is bonded into the lamp housing. For these headlamps, positioning ribs onto which the diffusing screen has been mounted are sprayed in the adhesive channel of the lamp housing. The previously injected adhesive is pushed to the side and used after polymerization as both a positioning means and as a sealant and adhesive. It is disadvantageous that the housing and the diffusing screen can still be displaced after mounting, thereby rendering positioning by means of gages ineffective. In addition, owing to the production tolerances in the fabrication of plastics, a geometric variance of the diffusing screen is to be expected relative to the housing, and is also a mounting tolerance between two components. In the case of motor vehicle design, undesirable gaps due to such tolerances can be seen. Furthermore, diffusing screens can be fastened directly in a mechanical fashion (for example, by stapling) and in this case the diffusing screen is connected directly to the adhesive channel of the lamp housing.

In addition, a range of lighting devices for motor vehicles and methods for producing them are known from the prior art; reference may be made to the following publications by way of example:

DE 197 22 005 B4 relates to a lighting device for vehicles, having a housing and a translucent cover pane that covers a light exit opening of the housing and that can be fastened on the housing by means of a plurality of latching connections distributed over the circumference of the latter, and a plurality of centering devices that are distributed over the circumference of the cover pane that are provided for aligning the cover pane with reference to the housing in a fashion transverse to the mounting direction. It is provided in this case that the centering devices and the latching connections are arranged offset from one another on the circumference of the cover pane, and that after a relatively short mounting path the centering devices are effective as the mounting path to latch the latching connections, the mounting path for the cover pane and the mounting path of the latching connections being the same. This design is intended to have the advantage that the functions of the alignment of the cover pane, which is effected by the centering devices, and of the fastening of the cover pane, which is effected by the latching connections, are separate. Moreover the cover pane should be aligned by the centering devices before it is fastened so that it can be fastened reliably in an exactly aligned position.

In a preferred refinement, there is arranged on the housing in addition to the latching connections at least one resilient latching arm that can be latched on the cover plate transverse to the mounting direction thereof, the latching of at least one latching arm being performed after a shorter mounting path than the mounting path that is required to latch the latching connections. The aim of this design is to enable preliminary fastening of the cover pane on the housing so that when being assembled the lighting device can, after preliminary mounting of the cover pane, be moved on further to a subsequent mounting station without there being the risk of the cover pane being removed from the housing again.

DE 197 19 832 A1 describes a vehicle luminaire in the case of which a front lens is fastened mechanically on a lamp body by means of a fastening device that is formed beyond the boundary between a wall, forming a sealing depression, and the front lens while a sealing lip region of the front lens is being inserted into the sealing depression provided with a sealing means. The fastening device comprises stopper protuberances that are formed on the wall of the lamp body that form the sealing depression, and tongue-shaped elastic parts that are formed on the sealing lip region and have openings. When the sealing lip region is inserted into the sealing depression to mount the front lens in the lamp body, the tongue-shaped, elastic parts are pressed against the stopper protuberances and thereby deformed elastically outwards. The stopper protuberances would then engage smoothly with the openings such that the sealing lip region would not fall out of the sealing depression without the need for a leaf spring.

The two documents DE 197 22 005 B4 and DE 197 19 832 A1 are in essence arrangements in which diffusing screens are fastened mechanically but do not permit mounting with a simple possibility of adjustment.

SUMMARY

It is the object of the present invention to improve upon known devices and methods, retain previous advantages, and overcome the disadvantages of the solutions previously found, and in particular to reduce or minimize manufacturing and mounting tolerances.

This object is achieved with the aid of the features as claimed in this application.

With reference to lighting devices for motor vehicles, a rapidly curing connecting means may be applied to at least one interface between the housing and the diffusing screen to position them. In this way, it becomes possible to reduce or minimize the manufacturing and mounting tolerances by using the rapidly curing connecting means to achieve accurate positioning of two components to be interconnected, doing so by bonding the aligned components immediately after alignment and holding them immovably in relation to one another after curing of the connecting means.

In this case, the inventive design may be aimed at the alignment and not the fastening of the diffusing screen. In this case, the rapidly curing connecting means may be used to achieve positioning of the two components to be interconnected, the components being held immovably relative to one another. The actual fastening, that is to say the connection and sealing of the components, is performed by a slowly curing adhesive that is brought between the components before or after the alignment. Even though the final adhesive has not yet been cured, the component can be transported further in the manufacturing process without loss of accurate adjustment and/or positioning.

In the preferred embodiment of the present invention, at least one edge flange to which the rapidly curing connecting means is applied is arranged on at least one of the interfaces between the housing and the diffusing screen.

In another embodiment of the present invention, it is provided that at least one adhesive flange to which the rapidly curing connecting means is applied is arranged on at least one of the interfaces between the housing and the diffusing screen. The components can be positioned precisely by means of three or more rapid connection flanges. At least one adhesive flange is aligned with an adhesive surface disposed substantially parallel to an adjusting plane. In the case of a headlamp, the adjusting plane may be a plane perpendicular to the direction of light emission. The diffusing screen may then be precisely aligned relative to the housing to a desired transverse position and height position, referred to as vehicle coordinates. There is no need for an alignment in the longitudinal direction since the adhesive flange is in contact flush with the other component.

According to a further feature of the present invention, it is provided that the rapidly curing connecting means is embodied as an adhesive. The adhesive may be applied before or after adjustment or alignment of the two components. The adhesive can be rapidly cured by exposure to ultrasound, infrared light, ultraviolet light, heat input, contact with air, or other suitable means.

The rapidly curing connecting means may also be embodied as a fused adhesive, including in conjunction with a fast-setting adhesive. A fused adhesive or material fusing technique may be accomplished for components made from plastic by arranging and engaging specific fusing points at the interfaces of the components that may be fused by suitable methods, such as with laser beams, infrared light, ultrasound, heated dies, friction welding, etc. It is also possible to fuse an additional plastic joint by applying material from a plastic welding wire to the joint.

The adhesive or fused adhesive may be provided at the interfaces of the components such that the slowly curing adhesive is not disturbed.

The object is achieved according to the invention with reference to the method for producing the lighting device for vehicles by virtue of the fact that a rapidly curing connecting means is applied to at least one interface between the housing and the diffusing screen to position them. To avoid repetition, reference is made to the statements relating to the inventive lighting device as regards the advantages arising in this case.

In the preferred embodiment of the inventive method, it is provided that at least one edge flange to which the rapidly curing connecting means is applied is arranged on at least one interface between the housing and the diffusing screen, while in the case of another embodiment it is provided that at least one adhesive flange to which the rapidly curing connecting means is applied is arranged on at least one of the interfaces between the housing and the diffusing screen.

According to a further feature of the inventive method, it is provided that an adhesive is applied as the rapidly curing connecting means.

Similarly, it is provided that a fused adhesive is provided as the rapidly curing connecting means.

BRIEF DESCRIPTION OF THE DRAWINGS

The invention is illustrated in an exemplary embodiment in the sole FIGURE of the drawing, in which:

FIG. 1 shows a simplified partial perspective view of an embodiment of the inventive lighting device for vehicles.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Regarding FIG. 1, a lighting device 10, such as a front headlamp for a vehicle, is shown. The lighting device 10 comprises a housing 11, a translucent diffusing screen 12 covering a light exit opening of the housing 11, and a reflector 13. The translucent diffusing screen 12 and the reflector 13 may be fastened to the housing 11. In FIG. 1, the reflector 13 is indicated only schematically by a corresponding arrow 13.

A rapidly curing connecting means may be applied to at least one interface between the housing 11 and the diffusing screen 12 to position them. In this case, the inventive design may be aimed at the alignment of the two components and not the fastening of the diffusing screen 12. The rapidly curing connecting means may facilitate positioning of two components to be interconnected when the components are held immovably relative to one another.

In the case of the preferred embodiment, the present invention provides that an adhesive flange 14 is arranged on the housing 11, an adhesive flange 14 is arranged on the diffusing screen 12, and the rapidly curing connecting means is applied when the housing 11 and diffusing screen 12 are positioned by aligning the adhesive flanges 14. After the alignment of the housing 11 and diffusing screen 12 relative to one another, both components 11, 12 are held in position until the adhesive or adhesive between the adhesive flanges 14 is cured. It is then possible for the lighting device 10 to be transported further in the manufacturing process, while a sealing adhesive that is introduced along the edge flange 15 may slowly cure.

A gap may be provided between the flange 14 of the housing 11 and the corresponding flange 14 of the diffusing screen 12. The gap may be influenced by manufacturing tolerances of the mating surfaces of the housing 11 and the diffusing screen 12. In the manufacturing process, the lens or diffusing screen 12 may be positioned with a robot or with appropriate gages to achieve a desired gap. The adhesive flanges 14 may be bonded or held together until an adhesive that is introduced or disposed in an adhesive channel completely polymerizes. Rapidly curing adhesives with gap-filling characteristics may be used, such as 2K adhesives or adhesives cured by UV light. This rapid connection means allows the lighting device 10 to be passed on to the next process step without concern of losing the proper orientation and alignment of the two components 11, 12.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A lighting device for a vehicle comprising:

a housing having a light exit opening and a first flange;

a translucent diffusing screen disposed over the light exit opening, the translucent diffusing screen having a second flange;

a rapidly curing adhesive that engages the first and second flanges to position the translucent diffusing screen with respect to the housing; and a second curing adhesive disposed between the housing and the translucent diffusing screen.

2. The lighting device of claim 1 wherein the first flange includes an edge flange that at least partially encircles the first flange.

3. The lighting device of claim 1 wherein the second flange includes an edge flange that at least partially encircles the second flange.

4. The lighting device of claim 1 wherein the first and second flanges are spaced apart from each other.

5. The lighting device of claim 4 wherein the first and second flanges are disposed substantially parallel to each other.

6. The lighting device of claim 1 wherein the first flange is disposed substantially parallel to an adjusting plane that is disposed substantially perpendicular to a direction of light emission.

7. A method for producing a headlamp, the method comprising:

providing a housing that has a light exit opening and a first flange that extends away from the light exit opening;

providing a diffusing screen that has a second flange that extends from an edge of the diffusing screen;

positioning the diffusing screen over the light exit opening;

aligning the second flange with the first flange;

holding the first and second flanges together with a rapidly curing adhesive to maintain positioning of the diffusing screen; and providing a second curing adhesive disposed between the housing and diffusing screen.

8. The method of claim 7 wherein the first and second flanges are spaced apart from each other and the rapidly curing adhesive is disposed between the first and second flanges.

9. The method of claim 8 wherein the first and second flanges are moved relative to each other to orient the diffusing screen before the rapidly curing adhesive is cured.

10. The method of claim 7 wherein the first and second flanges are directly fused together.

11. The lighting device of claim 1 wherein the second curing adhesive provides a seal between the housing and the diffusing screen.

12. The lighting device of claim 1 wherein the rapidly curing adhesive cures quicker than the second curing adhesive disposed between the housing and the translucent diffusing screen.

13. The method of claim 7 wherein the second curing adhesive provides a seal between the housing and the diffusing screen.

14. The method of claim 13 wherein the second curing adhesive fills a gap between the housing and the diffusing screen to seal the diffusing screen to the housing.

15. The method of claim 7 wherein the rapidly curing adhesive cures quicker than the second curing adhesive disposed between the housing and the diffusing screen.

16. A lighting device for a vehicle comprising:

a housing defining a light exit opening and having a mating edge with a flange extending therefrom;

a translucent diffusing screen disposed over the light exit opening and having a mating edge with a flange extending therefrom;

a rapidly cured adhesive disposed between the housing and screen flanges; and a sealing adhesive disposed between the housing and screen mating edges.

17. The lighting device of claim 16 wherein the rapidly cured adhesive cured quicker than the sealing adhesive.

18. The lighting device of claim 16 wherein the housing and screen flanges are spaced apart from each other and the rapidly cured adhesive fuses the screen flange to the housing flange.

19. The lighting device of claim 16 wherein the housing flange includes an edge flange that at least partially encircles the housing flange.

20. The lighting device of claim 16 wherein the housing flange is disposed substantially parallel to an adjusting plane that is disposed substantially perpendicular to a direction of light emission.

* * * * *